US009669785B2

(12) United States Patent
Holmstrom et al.

(10) Patent No.: US 9,669,785 B2
(45) Date of Patent: Jun. 6, 2017

(54) BUMPER ASSEMBLIES INCLUDING SPACER MEMBERS AND VEHICLES INCORPORATING THE SAME (71) Applicant: Toyota Motor Engineering & Manufacturing North America, Inc., Erlanger, KY (US)

(72) Inventors: Adam D. Holmstrom, Pinckney, MI (US); Behnaz Hajimohsen, Superior Township, MI (US); Jonathan R. Young, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/836,352

(22) Filed: Aug. 26, 2015

(65) Prior Publication Data
US 2017/0057439 A1    Mar. 2, 2017

(51) Int. Cl.
*B60R 19/04*    (2006.01)
*B60R 19/02*    (2006.01)
(52) U.S. Cl.
CPC .................. *B60R 19/023* (2013.01)
(58) Field of Classification Search
CPC . B60B 27/0005; B60B 27/00; B60B 27/0094; F16C 2326/02; B62D 21/152; B60R 19/18; B60R 19/34; B60R 19/483; B60R 21/0136
USPC ....... 293/149, 102, 117, 120, 121, 122, 132, 293/133, 154; 180/274; 296/187.03, 296/187.09, 193.09, 203.02
See application file for complete search history.

(56) References Cited

U.S. PATENT DOCUMENTS

| | | | | | |
|---|---|---|---|---|---|
| 3,891,258 | A | * | 6/1975 | Barenyi | B60R 19/26 293/120 |
| 4,422,680 | A | * | 12/1983 | Goupy | B60R 19/04 264/137 |
| 4,563,028 | A | * | 1/1986 | Ogawa | B60R 19/18 293/122 |
| 6,042,163 | A | * | 3/2000 | Reiffer | B60R 19/18 293/102 |
| 6,179,353 | B1 | * | 1/2001 | Heatherington | B60R 19/18 293/120 |
| 6,481,690 | B2 | * | 11/2002 | Kariatsumari | B60R 19/18 293/102 |
| 6,685,243 | B1 | * | 2/2004 | Evans | B60R 19/18 293/102 |

(Continued)

FOREIGN PATENT DOCUMENTS

WO    WO2014007403    1/2014

*Primary Examiner* — Kiran B Patel
(74) *Attorney, Agent, or Firm* — Dinsmore & Shohl LLP (57) ABSTRACT Embodiments of a bumper assembly includes a reinforcement beam that extends in a vehicle lateral direction, the reinforcement beam including a front face that extends in the vehicle lateral direction and a rear face that is positioned rearward of and spaced apart from the front face in a vehicle longitudinal direction that is transverse to the vehicle lateral direction, and a front spacer member coupled to an outboard end of the front face of the reinforcement beam, the front spacer member including an end plate that extends between the front face and the rear face of the reinforcement beam and is positioned at least partially within the reinforcement beam.

5 Claims, 7 Drawing Sheets (56) References Cited

U.S. PATENT DOCUMENTS

| | | | |
|---|---|---|---|
| 6,695,368 B1* | 2/2004 | Weykamp | B60R 19/26 293/122 |
| 6,733,055 B2* | 5/2004 | Iino | B60R 19/18 293/102 |
| 7,077,441 B2* | 7/2006 | Lee | B60R 19/18 293/120 |
| 7,080,862 B2* | 7/2006 | Suzuki | B60R 19/24 293/154 |
| 7,427,090 B2* | 9/2008 | Hodoya | B60R 19/18 293/102 |
| 7,559,589 B2 | 7/2009 | Nees | |
| 7,594,559 B2 | 9/2009 | Kitoh et al. | |
| 8,118,346 B2* | 2/2012 | Ginja | B60R 19/34 293/133 |
| 8,256,831 B2* | 9/2012 | Abe | B60R 19/34 296/133 |
| 8,398,154 B1* | 3/2013 | Nusier | B62D 21/152 280/784 |
| 8,403,385 B2 | 3/2013 | Sugimoto et al. | |
| 8,454,080 B2 | 6/2013 | Qu et al. | |
| 8,485,574 B2* | 7/2013 | Harada | B60R 19/18 293/120 |
| 8,517,454 B1* | 8/2013 | Huber | B60R 19/18 293/120 |
| 8,596,711 B2 | 12/2013 | Yasui et al. | |
| 8,608,231 B1 | 12/2013 | Mendivil et al. | |
| 8,733,823 B2 | 5/2014 | Brockhoff et al. | |
| 8,801,083 B2* | 8/2014 | Miyashita | B62D 21/152 296/187.1 |
| 9,010,845 B1* | 4/2015 | Ramoutar | B60R 19/14 293/155 |
| 9,045,100 B2* | 6/2015 | Kaneko | B60R 19/34 |
| 9,233,716 B2* | 1/2016 | Midoun | B62D 21/155 |
| 9,260,135 B2* | 2/2016 | Butukuri | B62D 21/155 |
| 9,272,678 B2* | 3/2016 | Nam | B60R 19/04 |
| 9,272,679 B1* | 3/2016 | Ramoutar | B62D 21/152 |
| 9,315,167 B1* | 4/2016 | Hardy | B60R 19/04 |
| 2008/0042455 A1* | 2/2008 | Nees | B60R 19/34 293/132 |
| 2008/0054655 A1* | 3/2008 | Kizaki | B60R 19/18 293/133 |
| 2009/0160204 A1* | 6/2009 | Czopek | B60R 19/18 293/133 |
| 2009/0315346 A1* | 12/2009 | Schelberg | B60R 19/18 293/133 |
| 2012/0007373 A1* | 1/2012 | Boettcher | B60R 19/24 293/132 |
| 2012/0032458 A1 | 2/2012 | Brooks et al. | |
| 2013/0256051 A1 | 10/2013 | Nakamura et al. | |
| 2013/0320709 A1 | 12/2013 | Kuwabara et al. | |
| 2014/0062129 A1 | 3/2014 | Syed et al. | |
| 2014/0091585 A1* | 4/2014 | Ramoutar | B60R 19/24 293/133 |
| 2014/0091595 A1* | 4/2014 | Ramoutar | B60R 19/24 296/187.09 |
| 2015/0142271 A1* | 5/2015 | Cuddihy | B60R 19/16 701/45 |
| 2015/0298634 A1* | 10/2015 | Hara | B60R 19/34 293/133 |
| 2016/0068191 A1* | 3/2016 | Kim | B62D 25/082 280/784 |
| 2016/0129869 A1* | 5/2016 | Le | B60R 21/26 701/45 |
| 2016/0152201 A1* | 6/2016 | Ramoutar | B60R 19/16 296/187.1 |
| 2016/0159300 A1* | 6/2016 | Matecki | B23P 15/00 293/120 |
| 2016/0167712 A1* | 6/2016 | Ogawa | B60R 19/24 296/187.1 |

* cited by examiner

BUMPER ASSEMBLIES INCLUDING SPACER MEMBERS AND VEHICLES INCORPORATING THE SAME

TECHNICAL FIELD

The present specification generally relates to bumper assemblies and vehicles that include bumper assemblies, and more specifically, bumper assemblies that include front spacer members.

BACKGROUND

Vehicles may be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and transferred rearward along the vehicle as the front suspension unit contacts vehicle structures proximate to a passenger cabin of the vehicle.

Accordingly, a need exists for alternative structures for transferring energy and absorbing energy from an impact with a small overlap to the front bumper.

SUMMARY

In one embodiment, a bumper assembly includes a reinforcement beam that extends in a vehicle lateral direction, the reinforcement beam including a front face that extends in the vehicle lateral direction and a rear face that is positioned rearward of and spaced apart from the front face in a vehicle longitudinal direction that is transverse to the vehicle lateral direction, and a front spacer member coupled to an outboard end of the front face of the reinforcement beam, the front spacer member including an end plate that extends between the front face and the rear face of the reinforcement beam and is positioned at least partially within the reinforcement beam.

In another embodiment, a vehicle includes a side support that extends in a vehicle longitudinal direction, a bumper assembly coupled to the side support, the bumper assembly including a reinforcement beam that extends in a vehicle lateral direction that is transverse to the vehicle longitudinal direction, the reinforcement beam including a front face that extends in the vehicle lateral direction and a rear face that is positioned rearward of and spaced apart from the front face in the vehicle longitudinal direction, and a front spacer member coupled the front face of the reinforcement beam at a position that is outboard of the side support, the front spacer member including an inboard portion that extends between the front face and the rear face of the reinforcement beam in the vehicle longitudinal direction and is positioned at least partially within the reinforcement beam.

In yet another embodiment, a vehicle includes a side support that extends in a vehicle longitudinal direction, a bumper assembly coupled to the side support, the bumper assembly including a reinforcement beam that extends in a vehicle lateral direction that is transverse to the vehicle longitudinal direction, the reinforcement beam including a front face that extends in the vehicle lateral direction and a rear face that is positioned rearward of and spaced apart from the front face in the vehicle longitudinal direction, and a front spacer member coupled to an outboard end of the front face of the reinforcement beam, the front spacer member including a front portion that extends across the front face of the reinforcement beam and an end plate that extends rearward from the front portion in a direction that is oriented transverse to the front face of the reinforcement beam, where at least a portion of the end plate is positioned within the reinforcement beam.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include bumper assemblies that include a reinforcement beam that extends in a vehicle lateral direction, the reinforcement beam including a front face and a rear face that is positioned rearward of and spaced apart from the front face of the reinforcement beam. A front spacer member is coupled to the front face of the reinforcement beam, the front spacer member including an end plate that extends between the front face and the rear face and is positioned at least partially within the reinforcement beam. In some embodiments, the front spacer member includes an inboard portion that extends between the front face and the rear face of the reinforcement beam and is positioned at least partially within the reinforcement beam. In some embodiments, the end plate extends in a direction that is transverse to the front face of the reinforcement beam. By extending between the front face and the rear face of the reinforcement beam and being positioned at least partially within the reinforcement beam, the front spacer member may restrict rearward translation of the front face with respect to the rear face and may form a generally rigid connection between the front face and the rear face of the reinforcement beam. In this way, the front spacer member may increase the strength and/or stiffness of the bumper assembly and assist in absorbing and/or directing energy and forces associated with a small front bumper overlap impact, as will be described herein with reference to the appended figures.

Figure 1:
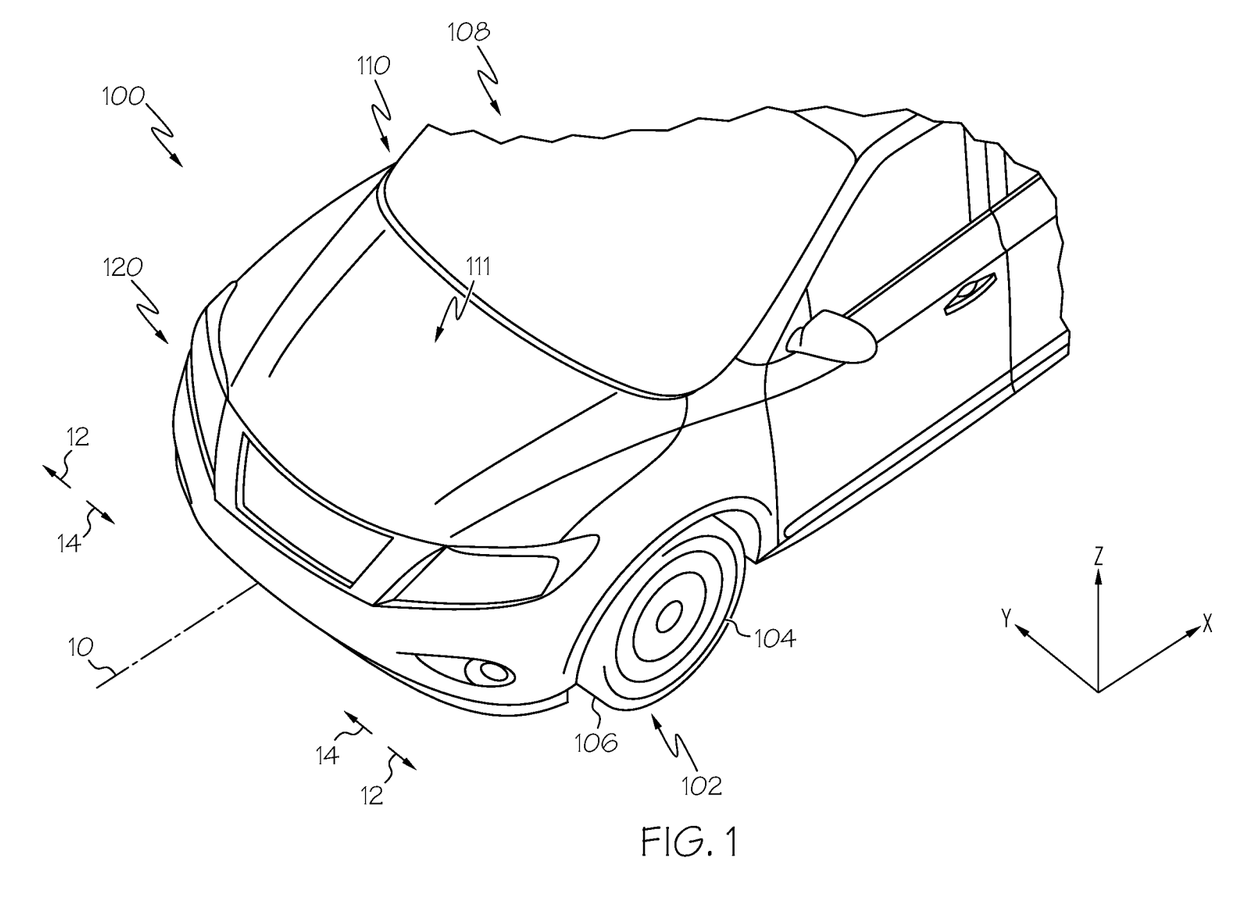
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. As the vehicle structures may be generally symmetrical about the vehicle centerline 10, the direction to which use of the terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While embodiments of the present disclosure are described and depicted herein in reference to unibody structures, it should be understood that vehicles that are constructed with body-on-frame construction may incorporate the elements that are shown and described herein. Furthermore, the appended figures may only show one side of the vehicle. Descriptions of the other side of the vehicle may be omitted as both sides of the vehicle may be laterally symmetrical and substantially the same.

Referring initially to FIG. 1, a vehicle 100 is depicted. The vehicle 100 includes a body 110 onto which a vehicle drivetrain is coupled. The vehicle 100 includes a cabin 108 that is integral with the body 110 and a front bay 111 where a drive source (e.g., an internal combustion engine and/or electric motor) may be positioned. In some embodiments, the drive source may be positioned in a rear portion of the vehicle, and the front bay 111 may utilized as a storage compartment. The cabin 108 generally defines a passenger cabin of the vehicle 100.

A front suspension unit 102 may be coupled to the body 110. The front suspension unit 102 may be coupled to a side support 112 (FIG. 2) and/or a sub-frame 118 (FIG. 2) of the body 110. As used herein, the front suspension unit 102 may generally include vehicle components that connect the body 110 to a tire 106. The front suspension unit 102 may include a wheel 104 that is surrounded by the tire 106.

Figure 2:
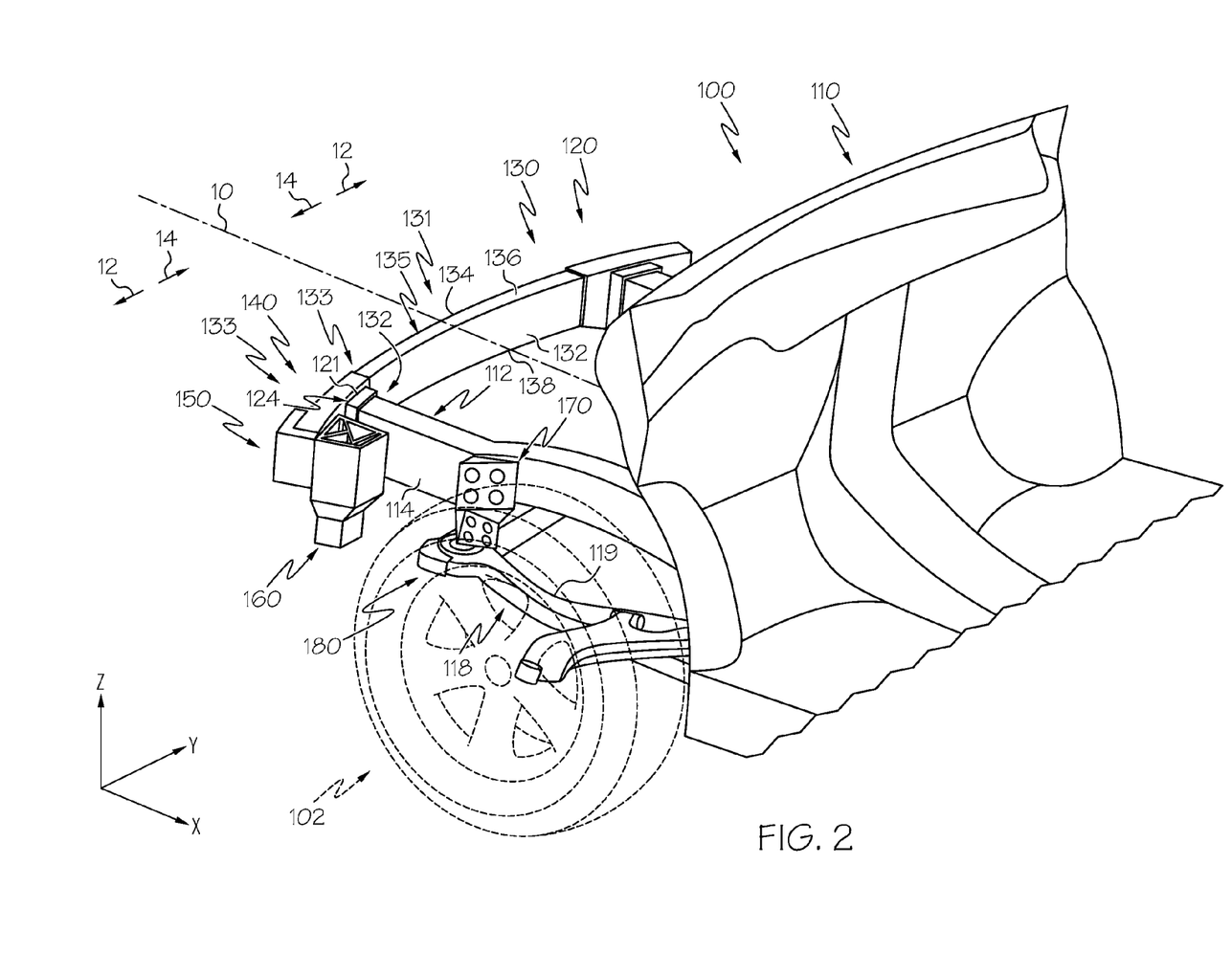
FIG. 2 schematically depicts a perspective view of a vehicle including a bumper assembly including a front spacer member and a rear spacer member according to one or more embodiments shown or described herein.

Referring to FIG. 2, the body 110 of the vehicle 100 and a bumper assembly 120 are depicted with certain panels removed for clarity. The bumper assembly 120 is positioned at the front of the vehicle 100. The bumper assembly 120 includes a rear face 132 that is coupled to the side support 112 of the body 110. The bumper assembly 120 includes a reinforcement beam 130 that extends in the vehicle lateral direction. The reinforcement beam 130 may be coupled to the side support 112 at a bumper assembly securement location 121. The side support 112 may include a crush box 124 that is coupled to the rear face 132 of the bumper assembly 120.

The side support 112 extends in the vehicle longitudinal direction between a front portion of the vehicle 100 and a rear portion of the vehicle 100. The side support may extend between the bumper assembly 120 which is positioned at the front portion of the vehicle and a rear bumper assembly (not depicted) which is positioned at the rear portion of the vehicle. As described hereinabove, the front suspension unit 102 may be coupled to the side support 112.

The body 110 includes the sub-frame 118 coupled to the body 110 and positioned beneath the side support 112 in the vehicle vertical direction. The sub-frame 118 may be coupled to the body 110 through a variety of joining techniques, including, but not limited to, a welded attachment, a brazed attachment, mechanical fasteners, and/or structural adhesives. The sub-frame 118 of the body 110 may be coupled to various elements of the vehicle 100, such as steering components (not depicted), the vehicle drive source, and/or the front suspension unit 102. The sub-frame 118 includes a longitudinal member 119 that generally extends in the vehicle longitudinal direction. The longitudinal member 119 is positioned below the side support 112 in the vehicle vertical direction, and may be coupled to the front suspension unit 102 and/or the drive source.

The reinforcement beam 130 may have a generally curved shape, as depicted in FIG. 2. More specifically, an inboard position 131 of the reinforcement beam 130 may be positioned forward of an outboard end 133 of the reinforcement beam 130 in the vehicle longitudinal direction, thereby giving the reinforcement beam 130 a generally curved shape. In other embodiments, the reinforcement beam 130 may have a generally straight shape extending in the vehicle lateral direction. The reinforcement beam 130 may alternatively have any suitable shape that extends in the vehicle lateral direction.

The bumper assembly 120 may include a bumper extension portion 140 that is positioned at the outboard end 133 of the reinforcement beam 130. While reference is made herein to one bumper extension portion 140, it should be understood that the bumper assembly 120 may include a similar or same bumper extension portion 140 at the opposite outboard end of the reinforcement beam 130. The bumper extension portion 140 may extend outboard beyond the side support 112 in the vehicle lateral direction. In some embodiments, the bumper extension portion 140 may be integrally formed with a central portion 135 of the reinforcement beam 130. In other embodiments, the bumper extension portion 140 may be formed as a separate member that is coupled to the central portion 135 of the reinforcement beam 130. In either instance, the bumper extension portion 140 may be considered part of the reinforcement beam 130. The bumper extension portion 140 and the reinforcement beam 130 may be formed from a variety of materials including, for example and without limitation, metals, composites, and the like, and may be formed by any suitable method or combination of methods such as stamping, forging, machining, and the like. The bumper extension portion 140 and the reinforcement beam 130 may be formed from the same material or different materials. The bumper extension portion 140 may be coupled to the reinforcement beam 130 through a variety of joining techniques, including, but not limited to, a welded attachment, a brazed attachment, mechanical fasteners, and/or structural adhesives.

The bumper assembly 120 including the reinforcement beam 130 and the bumper extension portion 140 include a front face 134 that is oriented to face forward in the vehicle longitudinal direction. The front face 134 of the reinforcement beam 130 and/or the bumper extension portion 140 is a generally planar surface that extends in the vehicle lateral direction. In other embodiments, the front face 134 of the reinforcement beam 130 and/or the bumper extension portion 140 may include a contoured surface that extends in the vehicle lateral direction. Alternatively, the front face 134 may be contoured at one of the reinforcement beam 130 or the bumper extension portion 140 and may be generally planar at the other. The reinforcement beam 130 and/or the bumper extension portion 140 further include a top face 136 and a bottom face 138 that is positioned opposite the top face 136 in the vehicle vertical direction. The top face 136 and the bottom face 138 of the reinforcement beam 130 and/or the bumper extension portion 140 are oriented transverse to the front face 134, and extend rearward from the front face 134 in the vehicle longitudinal direction. The reinforcement beam 130 and/or the bumper extension portion 140 include the rear face 132 that is positioned rearward of and spaced apart from the front face 134 in the vehicle longitudinal direction. The rear face 132 of the reinforcement beam 130 and/or the bumper extension portion 140 is oriented transverse to the top face 136 and the bottom face 138 of the reinforcement beam 130 and/or the bumper extension portion 140, and the rear face 132 is oriented to face rearward in the vehicle longitudinal direction.

A front spacer member 150 is coupled to the front face 134 of the reinforcement beam 130 and/or the bumper extension portion 140 at the outboard end 133 of the bumper assembly 120. In particular, the front spacer member 150 is coupled to the reinforcement beam 130 and/or the bumper extension portion 140 at a position that is outboard of the side support 112. A rear spacer member 160 is coupled to the rear face 132 of the reinforcement beam 130 and/or the bumper extension portion at the outboard end 133 of the bumper assembly 120. In particular, the rear spacer member 160 is coupled to the rear face 132 of the reinforcement beam 130 and/or the bumper extension portion 140 at a position that is outboard of the side support 112. The rear spacer member 160 may be positioned outboard of the side support 112 such that the rear spacer member 160 is spaced apart and detached from the side support 112 in the vehicle lateral direction. As the rear spacer member 160 may be spaced apart and detached from the side support 112, during an impact, the rear spacer member 160 may selectively translate inboard and direct energy and/or force associated with a small front bumper overlap impact into the side support 112.

Figure 3:
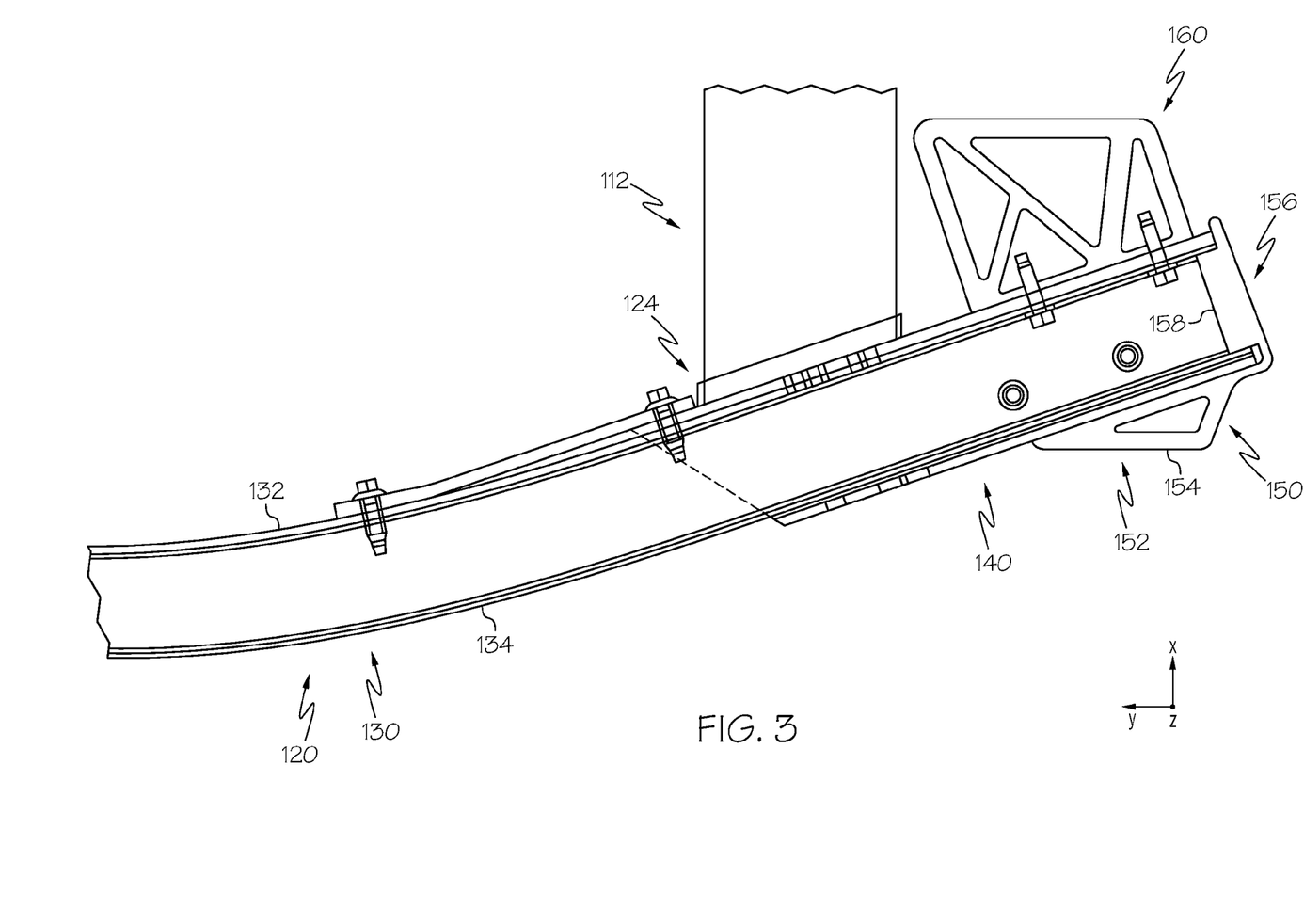
FIG. 3 schematically depicts a top view of the bumper assembly including the front spacer member and the rear spacer member of FIG. 2 according to one or more embodiments shown or described herein.

Referring to FIG. 3, a top view of the bumper assembly 120 including the front spacer member 150 and the rear spacer member 160 is depicted. The front spacer member 150 includes a front portion 152 that extends across the front face 134 of the reinforcement beam 130 and/or the bumper extension portion 140 in the vehicle lateral direction. The front portion 152 may include a contact face 154 that extends forward from the front face 134 of the reinforcement beam 130 and/or the bumper extension portion 140 in the vehicle longitudinal direction. The contact face 154 extends in a direction that is transverse to the vehicle longitudinal direction. As the contact face 154 extends in the direction that is transverse to the vehicle longitudinal direction, in some impact configurations, the contact face 154 may direct forces and/or energy associated with the impact generally rearward in the vehicle longitudinal direction, as opposed to inboard or outboard in the vehicle lateral direction.

The front spacer member 150 includes an end plate 156 that extends between the front face 134 and the rear face 132 of the reinforcement beam 130 and/or the bumper extension portion 140. The end plate 156 extends rearward from and is oriented transverse to the front face 134 of the reinforcement beam 130 and/or the bumper extension portion 140. At least a portion of the end plate 156 extends at least partially within the reinforcement beam 130 and/or the bumper extension portion 140. In particular, the end plate 156 includes an inboard portion 158 that extends at least partially within the reinforcement beam 130 and/or the bumper extension portion 140. The end plate 156 and the inboard portion 158 are integral with the front portion 152 of the front spacer member 150. Alternatively, the end plate 156 and the inboard portion 158 may be a separate member that is coupled to the front portion 152 of the front spacer member.

The inboard portion 158 extends between the front face 134 and the rear face 132 and is positioned at least partially within the reinforcement beam 130 and/or the bumper extension portion. As the inboard portion 158 is positioned within the reinforcement beam 130 and/or the bumper extension portion 140 and extends between the front face 134 and the rear face 132, the inboard portion 158 may form a generally rigid connection between the front face 134 and the rear face 132 in the vehicle longitudinal direction. Accordingly, the end plate 156 and the inboard portion 158 resist rearward translation of the front face 134 with respect to the rear face 132 in the vehicle longitudinal direction, such as during a small front bumper overlap impact. By resisting rearward translation of the front face 134 with respect to the rear face 132 of the reinforcement beam 130 and/or the bumper extension portion 140, the end plate 156 and the inboard portion 158 increase the strength and/or stiffness of the bumper assembly 120 at positions proximate to the end plate 156 and the inboard portion 158. By increasing the strength and/or stiffness, the end plate 156 and the inboard portion 158 may thereby increase the amount of energy that may be absorbed by the bumper assembly 120 during a small front bumper overlap impact.

The front spacer member 150 may be coupled to the front face 134 of the reinforcement beam 130 and/or the bumper extension portion 140 through a variety of joining techniques, including, but not limited to, a welded attachment, a brazed attachment, mechanical fasteners, and/or structural adhesives. In embodiments, the front spacer member 150 is formed from aluminum. Alternatively, the front spacer member 150 may be formed from a variety of materials including, for example and without limitation, metals, composites, and the like, and may be formed by any suitable method or combination of methods such as stamping, forging, machining, and the like.

The rear spacer member 160 is coupled to the rear face 132 of the bumper extension portion 140 and/or the reinforcement beam 130 and extends rearward from the rear face 132 in the vehicle longitudinal direction. As described hereinabove, the rear spacer member 160 is coupled to the outboard end 133 of the bumper assembly at a position that is outboard from the side support 112.

Figure 4:
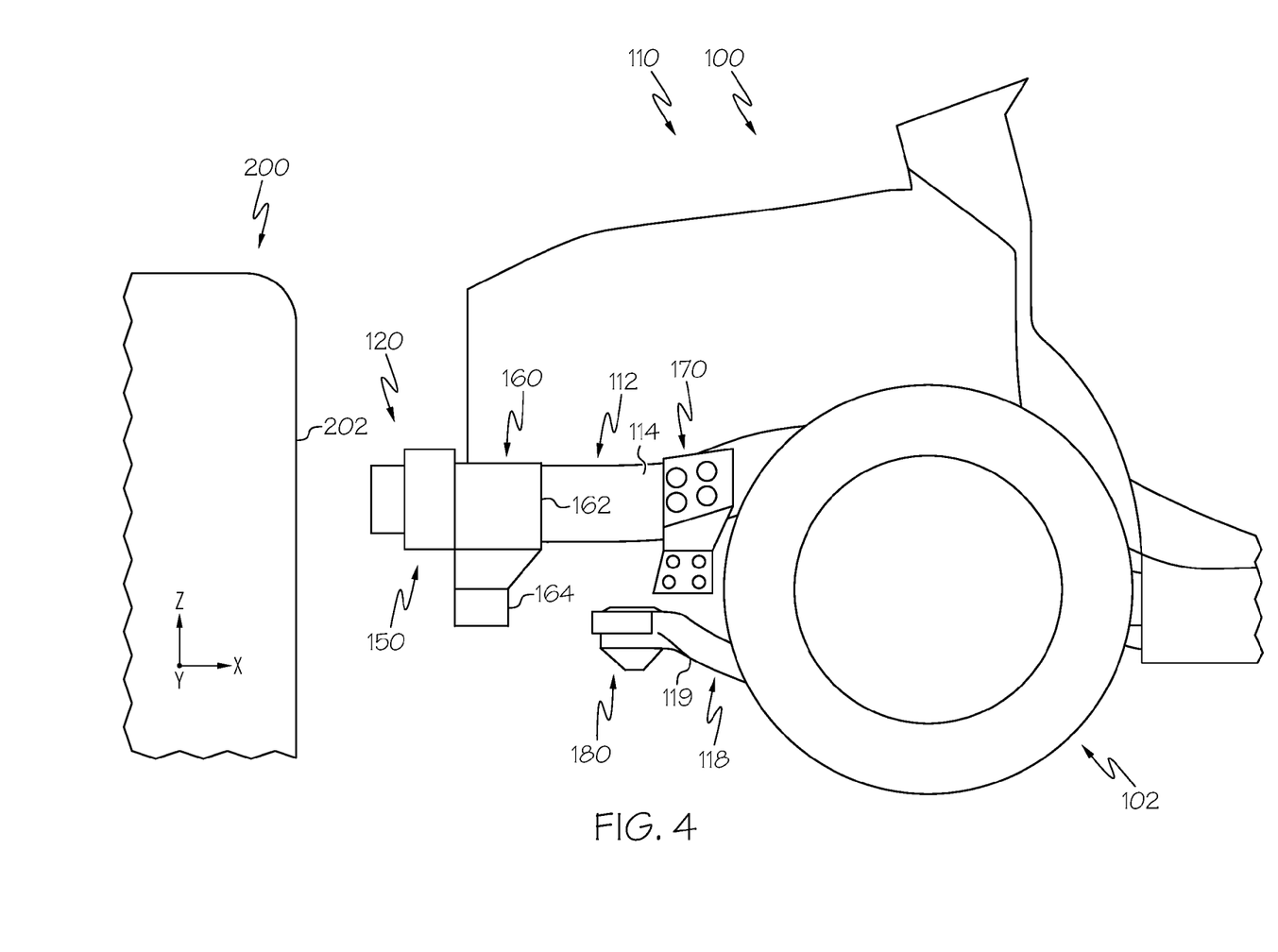
FIG. 4 schematically depicts a side view of the bumper assembly including the front spacer member and the rear spacer member shown in FIG. 2 prior to a small front bumper overlap impact according to one or more embodiments shown or described herein.

Referring to FIG. 4, a side view of the bumper assembly 120 including the front spacer member 150 and the rear spacer member 160 is depicted. The rear spacer member 160 includes an upper portion 162 and a lower portion 164 that is positioned below the upper portion 162 in the vehicle vertical direction. The upper portion 162 is coupled to the lower portion 164. Alternatively, the upper portion 162 and the lower portion 164 are integrally formed. The lower portion 164 extends below the upper portion 162 such that the rear spacer member 160 extends at least between the side support 112 and the sub-frame 118 in the vehicle vertical direction. The upper portion 162 may be positioned rearward of the lower portion 164 in the vehicle longitudinal direction.

The rear spacer member 160 may be coupled to the rear face 132 of the reinforcement beam 130 and/or the bumper extension portion 140 through a variety of joining techniques, including, but not limited to, a welded attachment, a brazed attachment, mechanical fasteners, and/or structural adhesives. Likewise, the upper portion 162 may be coupled to the lower portion 164 of the rear spacer member 160 through a variety of joining techniques, including, but not limited to, a welded attachment, a brazed attachment, mechanical fasteners, and/or structural adhesives. The upper portion 162 and the lower portion 164 of the rear spacer member 160 are formed from aluminum. Alternatively, the upper portion 162 and the lower portion 164 of the rear spacer member 160 may be formed from a variety of materials including, for example and without limitation, metals, composites, and the like, and may be formed by any suitable method or combination of methods such as stamping, forging, machining, and the like. It should be understood that the upper portion 162 and the lower portion 164 may be formed from the same material or may be formed from different materials.

A side support catcher portion 170 is coupled to the side support 112. The side support catcher portion 170 is coupled to and extends outboard of an outboard side 114 of the side support 112 at a location that is spaced apart from and rearward of the rear spacer member 160 in the vehicle longitudinal direction. The side support catcher portion 170 may also be aligned with the upper portion 162 of the rear spacer member 160 in the vehicle vertical direction. The side support catcher portion 170 may be coupled to the outboard side 114 of the side support 112 through a variety of joining techniques, including, but not limited to, a welded attachment, a brazed attachment, mechanical fasteners, and/or structural adhesives. The side support catcher portion 170 may be may be formed from a variety of materials including, for example and without limitation, metals, composites, and the like, and may be formed by any suitable method or combination of methods such as stamping, forging, machining, and the like.

A sub-frame catcher portion 180 is coupled to the sub-frame 118 of the body 110 that is positioned beneath the side support 112 in the vehicle vertical direction. The sub-frame catcher portion 180 is coupled to the longitudinal member 119 of the sub-frame 118. The sub-frame catcher portion 180 may be coupled to the sub-frame 118 at a location that is spaced apart from and rearward of the rear spacer member 160 in the vehicle longitudinal direction, but aligned with the lower portion 164 of the rear spacer member 160 in the vehicle vertical direction. The sub-frame catcher portion 180 may be coupled to the sub-frame 118 through a variety of joining techniques, including, but not limited to, a welded attachment, a brazed attachment, mechanical fasteners, and/or structural adhesives. The sub-frame catcher portion 180 may be may be formed from a variety of materials including, for example and without limitation, metals, composites, and the like, and may be formed by any suitable method or combination of methods such as stamping, forging, machining, and the like.

Figure 5:
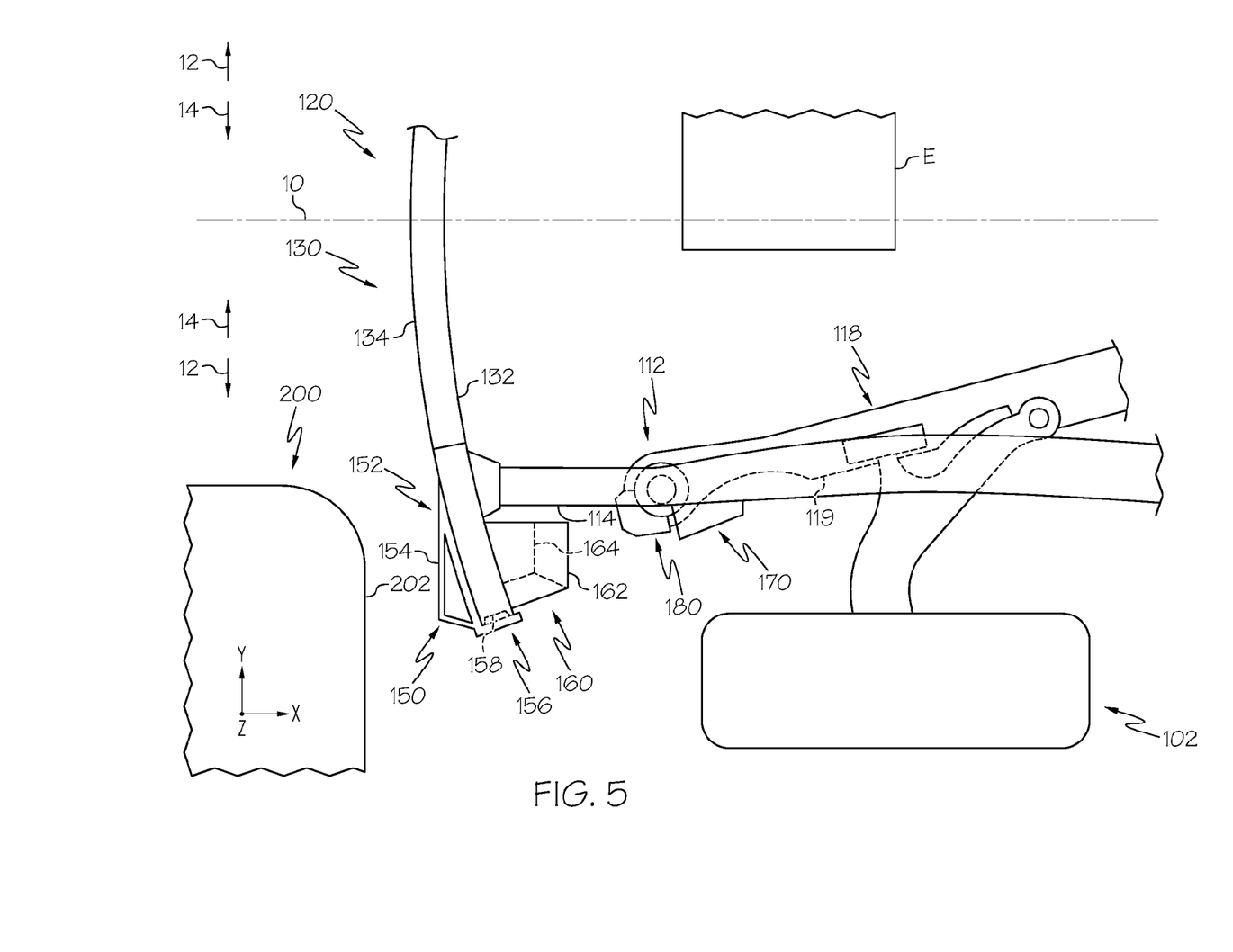
FIG. 5 schematically depicts a top view of the bumper assembly including the front spacer member and the rear spacer member shown in FIG. 4 prior to a small front bumper overlap impact according to one or more embodiments shown or described herein.

Referring now to FIG. 5, a top view of the front spacer member 150, the rear spacer member 160, the side support catcher portion 170, and the sub-frame catcher portion 180 is depicted. The sub-frame catcher portion 180 is positioned forward of the side support catcher portion 170 in the vehicle longitudinal direction. Both the side support catcher portion 170 and the sub-frame catcher portion 180 may be positioned at least partially forward of the front suspension unit 102.

Referring collectively to FIGS. 4 and 5, during ordinary vehicle operation, the rear spacer member 160 may be positioned in a deactivated configuration. In the deactivated configuration, the upper portion 162 and the lower portion 164 are detached and spaced apart from the side support catcher portion 170 and the sub-frame catcher portion 180, respectively, in the vehicle longitudinal direction. However, the upper portion 162 and the lower portion 164 are aligned with the side support catcher portion 170 and the sub-frame catcher portion 180 in the vehicle vertical direction, respectively. Further, the rear spacer member 160 may be detached and spaced apart from the outboard face 114 of the side support 112 in the vehicle lateral direction. The rear spacer member 160 and the side support catcher portion 170 and the sub-frame catcher portion 180 may assist transferring energy associated with an impact, such as a small front bumper overlap impact, from the reinforcement beam 130 and/or the bumper extension portion 140 to the side support 112.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The front corner of the vehicle may impact an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, no more than about 25% of the front bumper strikes the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the body 110 for example, may be non-symmetrically loaded when the vehicle is involved in a small overlap impact.

Because only a portion of the front bumper strikes an object during a small front bumper overlap impact, all of the energy absorbing structures associated with the front bumper may have a reduced effect on the dissipation of energy of the impact. In particular, some of the energy absorbing structures associated with the bumper assembly 120 of the vehicle 100 may not be activated or may be only partially activated, such that a portion of the energy absorbing structure of the vehicle may not dissipate energy associated with the small front bumper overlap impact. Instead, the energy and/or forces associated with the impact may be directed into the front suspension unit 102 of the vehicle 100 proximate to the barrier that the vehicle impacts. As energy from the impact may be directed into the front suspension unit 102 of the vehicle 100, the front suspension unit 102 may translate rearward in the vehicle longitudinal direction and may contact the cabin 108 of the vehicle, transmitting energy and/or forces associated with the impact into the cabin 108 of the vehicle 100.

FIGS. 4 and 5 illustrate the vehicle 100 prior to a small front bumper overlap impact with a barrier, for example, during a small front bumper overlap impact test. In a small front bumper overlap impact or small front bumper overlap test, the vehicle 100 may impact a barrier 200 (or vice versa). Referring in particular to FIG. 4, a vehicle-facing surface 202 of the barrier 200 may extend in a direction that is transverse to the vehicle longitudinal direction. As described hereinabove, the contact face 154 of the front spacer member 150 extends in a direction that is transverse to the vehicle longitudinal direction. Accordingly, in some impact configurations, the contact face 154 of the front spacer member 150 and the vehicle-facing surface 202 of the barrier extend in the same or substantially the same direction. As the contact face 154 and the vehicle-facing surface 202 extend in the same or substantially the same direction, force and/or energy associated with impact between the vehicle-facing surface 202 and the front spacer member 150 may be directed generally rearward in the vehicle longitudinal direction. As the bumper assembly 120 is coupled to the side support 112, the bumper assembly 120 may direct energy and/or forces associated with the impact into the side support 112. As the energy and/or forces associated with the impact are directed primarily rearward in the vehicle longitudinal direction, the side support 112 may deform and translate primarily rearward in the vehicle longitudinal direction, which may absorb more energy associated with the impact as compared to impact configurations in which the side support deflects inboard or outboard and away from the impact.

Figure 6:
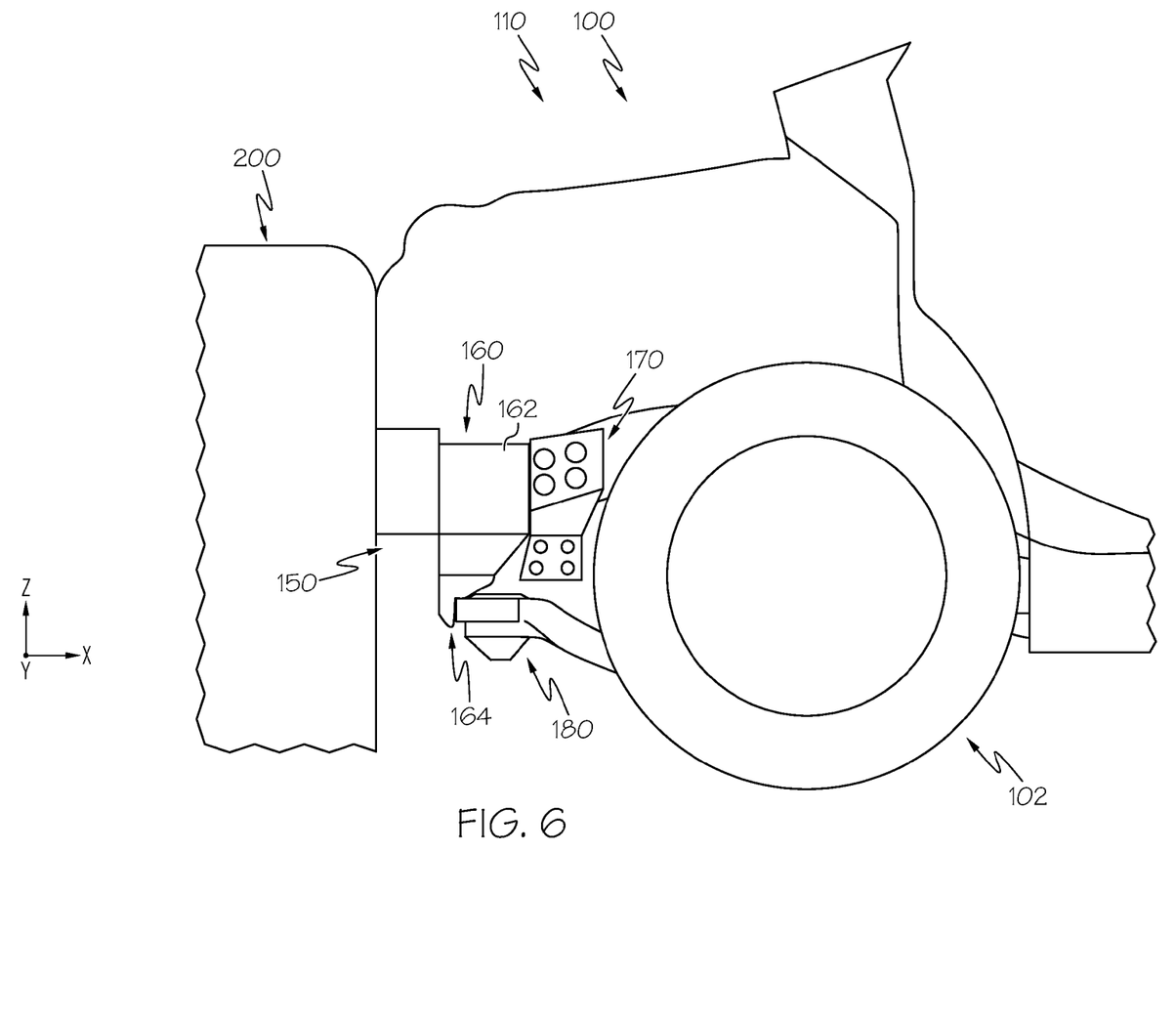
FIG. 6 schematically depicts a side view of the bumper assembly including the front spacer member and the rear spacer member shown in FIG. 4 during a small front bumper overlap impact according to one or more embodiments shown or described herein.
Figure 7:
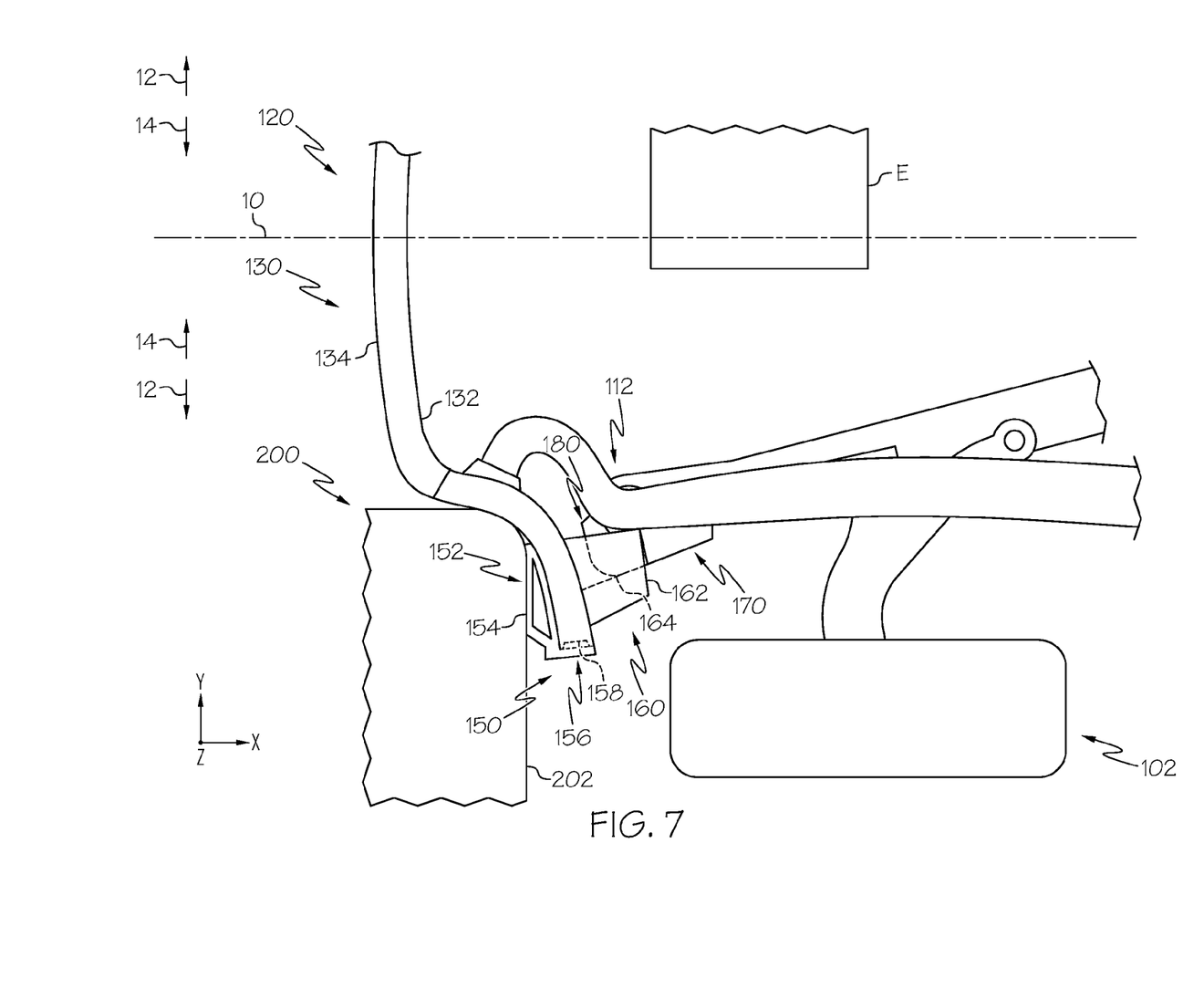
FIG. 7 schematically depicts a top view of the bumper assembly including the front spacer member and the rear spacer member shown in FIG. 4 during the small front bumper overlap impact according to one or more embodiments shown or described herein.

In some impact configurations, such as the small front bumper overlap impact depicted in FIGS. 6 and 7, the vehicle-facing surface 202 of the barrier 200 may impact the reinforcement beam 130 and/or the bumper extension portion 140 of the bumper assembly 120. As the reinforcement beam 130 and/or the bumper extension portion 140 overlaps the vehicle-facing surface 202 of the barrier 200, the impact between the vehicle-facing surface 202 of the barrier 200 and the bumper assembly 120 may be directed into the reinforcement beam 130 and/or the bumper extension portion 140. As energy and/or force associated with the impact is directed into the reinforcement beam 130 and/or the bumper extension portion 140, the reinforcement beam 130 and/or the bumper extension portion 140 may plastically and elastically deform and translate rearward in the vehicle longitudinal direction.

As described hereinabove, the reinforcement beam 130 and/or the bumper extension portion 140 is coupled to the side support 112. As the reinforcement beam 130 and/or the bumper extension portion 140 of the bumper assembly 120 may initially deform and translate primarily rearward in the vehicle longitudinal direction, the reinforcement beam 130 may direct force and/or energy associated with the impact into the side support 112 such that the energy is directed rearward in the vehicle longitudinal direction. As the energy associated with the impact causes the side support 112 to plastically and elastically deform, the side support 112 may continue to absorb energy. By absorbing energy associated with the impact, the side support 112 may reduce the amount of energy that is directed rearward toward the cabin 108 (FIG. 1) of the vehicle 100. Accordingly, by directing energy associated with the impact rearward in the vehicle longitudinal direction, the side support 112 may reduce the amount of energy associated with the impact that is directed into the cabin 108 of the vehicle 100.

Referring collectively to FIGS. 6 and 7, as the bumper assembly 120 plastically and elastically deforms and translates rearward in the vehicle longitudinal direction, energy associated with the impact may reposition the rear spacer member 160 from the deactivated configuration into an activated configuration. In the activated configuration, the rear spacer member 160 that is coupled to the reinforcement beam 130 and/or the bumper extension portion 140 is brought into contact with the side support catcher portion 170 and the sub-frame catcher portion 180. More specifically, the upper portion 162 of the rear spacer member 160 is brought into contact with the side support catcher portion 170 and the lower portion 164 of the rear spacer member 160 is brought into contact with the sub-frame catcher portion 180.

Contact between the rear spacer member 160 and the side support catcher portion 170 and the sub-frame catcher portion 180 may restrict further rearward translation of the bumper assembly 120 in the vehicle longitudinal direction. As described hereinabove, at least a portion of the side support catcher portion 170 and the sub-frame catcher portion 180 are positioned forward of the front suspension unit 102 in the vehicle longitudinal direction. Accordingly, by restricting further rearward translation of the bumper assembly 120, contact between the rear spacer member 160 and the side support catcher portion 170 and the sub-frame catcher portion 180 may reduce the energy and/or forces associated with the impact that are directed into the front suspension unit 102. Contact between the rear spacer member 160 and the side support catcher portion 170 and the sub-frame catcher portion 180 may thereby reduce energy and/or forces that are directed into the cabin 108 of the vehicle 100 through contact between the front suspension unit 102 and the cabin 108.

Contact between the rear spacer member 160 and the side support catcher portion 170 and the sub-frame catcher portion 180 may provide a load path between the bumper assembly 120 and the side support 112 as well as between the bumper assembly 120 and the sub-frame 118. In particular, energy and/or forces associated with the impact may be directed into the side support 112 through contact between the upper portion 162 of the rear spacer member 160 and the side support catcher portion 170. Similarly, energy and/or forces associated with the impact may be directed into the sub-frame 118 through contact between the lower portion 164 of the rear spacer member 160 and the sub-frame catcher portion 180. As energy and/or forces associated with the impact may be directed into the side support 112 and the sub-frame 118, the energy and/or forces associated with the impact may selectively deform the side support 112 and the sub-frame 118, thereby reducing the energy and/or forces associated with the impact that may be directed into the cabin 108 (FIG. 1) of the vehicle 100.

Further, the inboard portion 158 of the end plate 156 of the front spacer member 150 extends at least partially within the reinforcement beam 130 and/or the bumper extension portion 140 and extends between the front face 134 and the rear face 132, which restricts rearward translation of the front face 134 with respect to the rear face 132. Accordingly, as described hereinabove, the inboard portion 158 of the end plate 156 may increase the strength and/or stiffness of the bumper assembly 120 at positions proximate to the inboard portion 158. As the front spacer member 150 is positioned at the outboard end 133 of the bumper assembly 120 at a position that is outboard of the side support 112 in the vehicle lateral direction, the inboard portion 158 may be positioned proximate to the barrier 200 in some impact configurations, such as the small front bumper overlap impact depicted in FIGS. 6 and 7. Accordingly by increasing the strength and/or stiffness of the bumper assembly 120 proximate to the barrier 200, the inboard portion 158 may assist in absorbing energy associated with the impact as well as directing energy and/or forces associated with the impact into the side support 112 and the sub-frame 118 through the rear spacer member 160.

Accordingly, the above-described bumper assemblies include a reinforcement beam that extends in a vehicle lateral direction, the reinforcement beam including a front face and a rear face that is positioned rearward of and spaced apart from the front face of the reinforcement beam. A front spacer member is coupled to the front face of the reinforcement beam, the front spacer member including an end plate that extends between the front face and the rear face and is positioned at least partially within the reinforcement beam. In some embodiments, the front spacer member includes an inboard portion that extends between the front face and the rear face of the reinforcement beam and is positioned at least partially within the reinforcement beam. In some embodiments, the end plate extends in a direction that is transverse to the front face of the reinforcement beam. By extending between the front face and the rear face of the reinforcement beam and being positioned at least partially within the reinforcement beam, the front spacer member may restrict rearward translation of the front face with respect to the rear face and may form a generally rigid connection between the front face and the rear face of the reinforcement beam. In this way, the front spacer member may increase the strength and/or stiffness of the bumper assembly and assist in absorbing and/or directing energy and forces associated with a small front bumper overlap impact.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper assembly comprising:
    a reinforcement beam that extends in a vehicle lateral direction, the reinforcement beam comprising a front face that extends in the vehicle lateral direction and a rear face that is positioned rearward of and spaced apart from the front face in a vehicle longitudinal direction that is transverse to the vehicle lateral direction;
    a front spacer member coupled to an outboard end of the front face of the reinforcement beam, the front spacer member comprising an end plate that extends between the front face and the rear face of the reinforcement beam and is positioned at least partially within the reinforcement beam;
    a rear spacer member coupled to and extending rearwardly along the vehicle longitudinal direction from the rear face; and
    at least one of a side support catcher portion and a sub-frame catcher portion in selective cooperation with the rear spacer member such that upon impact forces that are substantially along the vehicle longitudinal direction being imparted to at least the front spacer member, contact between the rear spacer member and at least one of the side support catcher portion and the sub-frame catcher portion reduce forces associated with the impact into at least one of a vehicular front suspension unit and a vehicular cabin.

2. The bumper assembly of claim 1, further comprising a bumper extension portion positioned at the outboard end of the reinforcement beam, wherein the front spacer member is coupled to the bumper extension portion.

3. The bumper assembly of claim 1, wherein the front spacer member further comprises a contact face that extends forward from the front face of the reinforcement beam in the vehicle longitudinal direction.

4. The bumper assembly of claim 3, wherein the contact face extends in a direction that is transverse to the vehicle longitudinal direction.

5. The bumper assembly of claim 1, wherein the front spacer member and the rear spacer member are formed from aluminum.

* * * * *